(12) United States Patent
Sacreste et al.

(10) Patent No.: US 9,500,760 B2
(45) Date of Patent: Nov. 22, 2016

(54) COLLAR SYSTEM AND METHOD FOR RECOVERING A TOW MEMBER IN A MARINE SURVEY SYSTEM

(71) Applicant: CGG SERVICES SA, Massy (FR)

(72) Inventors: Marie-fleur Sacreste, Paris (FR); Hélène Tonchia, Antony (FR)

(73) Assignee: CGG SERVICES SA, Massy (FR)

( * ) Notice: Subject to any disclaimer, the term of this patent is extended or adjusted under 35 U.S.C. 154(b) by 327 days.

(21) Appl. No.: 14/187,674

(22) Filed: Feb. 24, 2014

(65) Prior Publication Data

US 2014/0334255 A1    Nov. 13, 2014

Related U.S. Application Data

(60) Provisional application No. 61/844,573, filed on Jul. 10, 2013, provisional application No. 61/815,759, filed on Apr. 25, 2013, provisional application No. 61/815,754, filed on Apr. 25, 2013.

(51) Int. Cl.
*G01V 1/38* (2006.01)
*B63B 21/66* (2006.01)
*G01V 1/20* (2006.01)
*H01R 13/523* (2006.01)

(52) U.S. Cl.
CPC ............... *G01V 1/38* (2013.01); *B63B 21/66* (2013.01); *G01V 1/202* (2013.01); *G01V 1/3817* (2013.01); *H01R 13/523* (2013.01)

(58) Field of Classification Search
CPC ...... H01R 13/523; G01V 1/202; G01V 1/38; G01V 1/3817
See application file for complete search history.

(56) References Cited

U.S. PATENT DOCUMENTS

| | | | |
|---|---|---|---|
| 21,219 A | 8/1858 | Sibley | |
| 1,869,506 A * | 8/1932 | Richardson | B64D 5/00 114/252 |
| 3,047,259 A | 7/1962 | Tatnall et al. | |
| 3,353,512 A * | 11/1967 | Kawerninski | B63B 21/62 114/250 |
| 3,369,216 A * | 2/1968 | Loper | G01V 1/3826 367/16 |
| 3,371,739 A * | 3/1968 | Pearson | G01V 1/3826 367/18 |
| 3,380,425 A * | 4/1968 | Wilson | B63B 35/815 114/249 |

(Continued)

FOREIGN PATENT DOCUMENTS

WO    2014/082856 A3    6/2014

OTHER PUBLICATIONS

Extended European Search Report in corresponding European Patent Application No. 14161880.1 dated Dec. 22, 2015. (Reference D1, WO 2010/009249 A2, also published as US 2010/0170428 and US 8,792,298, was previously submitted with an Information Disclosure Statement dated Feb. 24, 2014).

*Primary Examiner* — Luke Ratcliffe
*Assistant Examiner* — Hovhannes Baghdasaryan
(74) *Attorney, Agent, or Firm* — Patent Portfolio Builders PLLC

(57) ABSTRACT

A marine survey system includes a collar configured to be affixed to a tow member, to connect a separation member to the tow member and to release the separation member when a lock-release condition is met. Alternatively or additionally, the marine survey system includes a variable drag force mechanism configured to generate a first drag force pushing the collar downstream before the collar reaches a downstream element beyond which the collar cannot move, and to generate a second drag force after the collar has reached the downstream element.

19 Claims, 16 Drawing Sheets

(56) References Cited

U.S. PATENT DOCUMENTS

| | | | | |
|---|---|---|---|---|
| 3,482,034 A * | 12/1969 | Rhoades | | A01K 73/02 114/244 |
| 3,666,216 A * | 5/1972 | Nagy | | B63B 21/66 244/1 R |
| 4,134,634 A * | 1/1979 | Baur | | B60D 1/64 114/247 |
| 4,260,180 A * | 4/1981 | Halushka | | F16L 37/004 285/391 |
| 4,317,185 A * | 2/1982 | Thigpen | | G01V 1/201 114/242 |
| 4,682,831 A * | 7/1987 | McNeel | | H01R 13/28 439/277 |
| 5,029,773 A | 7/1991 | Lecat | | |
| 5,123,374 A * | 6/1992 | McMillan | | B63B 21/60 114/230.3 |
| 5,197,716 A * | 3/1993 | Zibilich, Jr. | | B63B 35/04 254/134.3 R |
| 5,199,659 A * | 4/1993 | Zibilich, Jr. | | B63B 21/66 114/254 |
| 5,692,918 A * | 12/1997 | Hill | | G01V 1/208 174/101.5 |
| 5,871,173 A | 2/1999 | Frank et al. | | |
| 5,979,838 A * | 11/1999 | Romagnoli, Jr. | | F16L 1/26 248/62 |
| 5,983,821 A * | 11/1999 | Williams | | B63B 21/66 114/244 |
| 6,074,253 A * | 6/2000 | Brinchmann-Hansen | | G01V 1/201 439/624 |
| 6,889,624 B1 * | 5/2005 | Mulhern | | B63B 21/56 114/221 R |
| 7,577,060 B2 | 8/2009 | Toennessen et al. | | |
| 7,933,165 B2 * | 4/2011 | Thompson | | G01V 1/201 114/249 |
| 8,792,298 B2 * | 7/2014 | Toennessen | | B63B 21/66 114/249 |
| 2002/0064088 A1 * | 5/2002 | Barker | | B63B 21/663 367/20 |
| 2004/0050314 A1 * | 3/2004 | Williams | | G01V 1/201 114/243 |
| 2006/0054186 A1 | 3/2006 | Lepage et al. | | |
| 2010/0170428 A1 | 7/2010 | Toennessen | | |
| 2012/0300581 A1 | 11/2012 | Vahida | | |
| 2016/0006169 A1 * | 1/2016 | Relion | | G01V 1/202 439/292 |

* cited by examiner

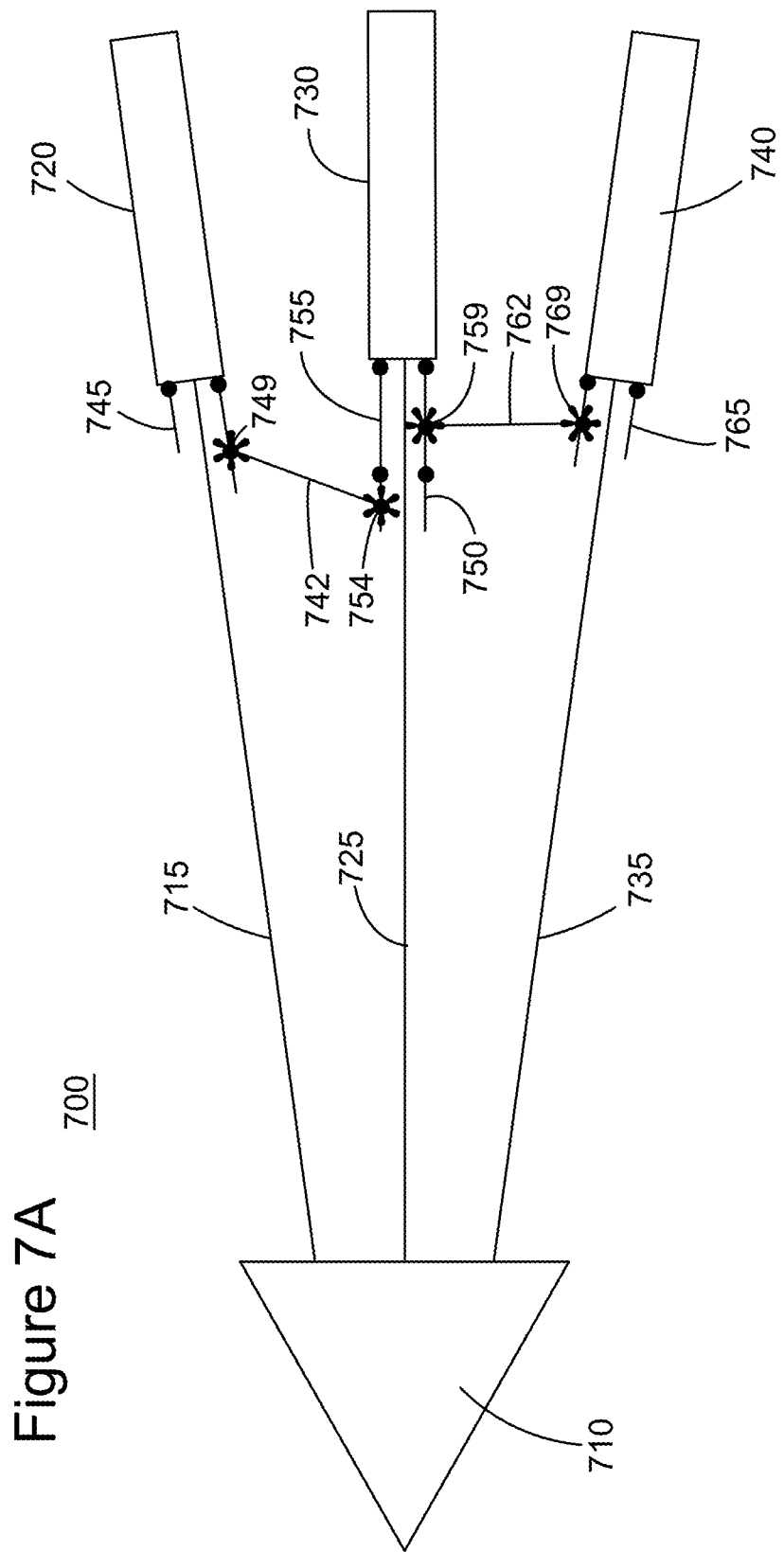

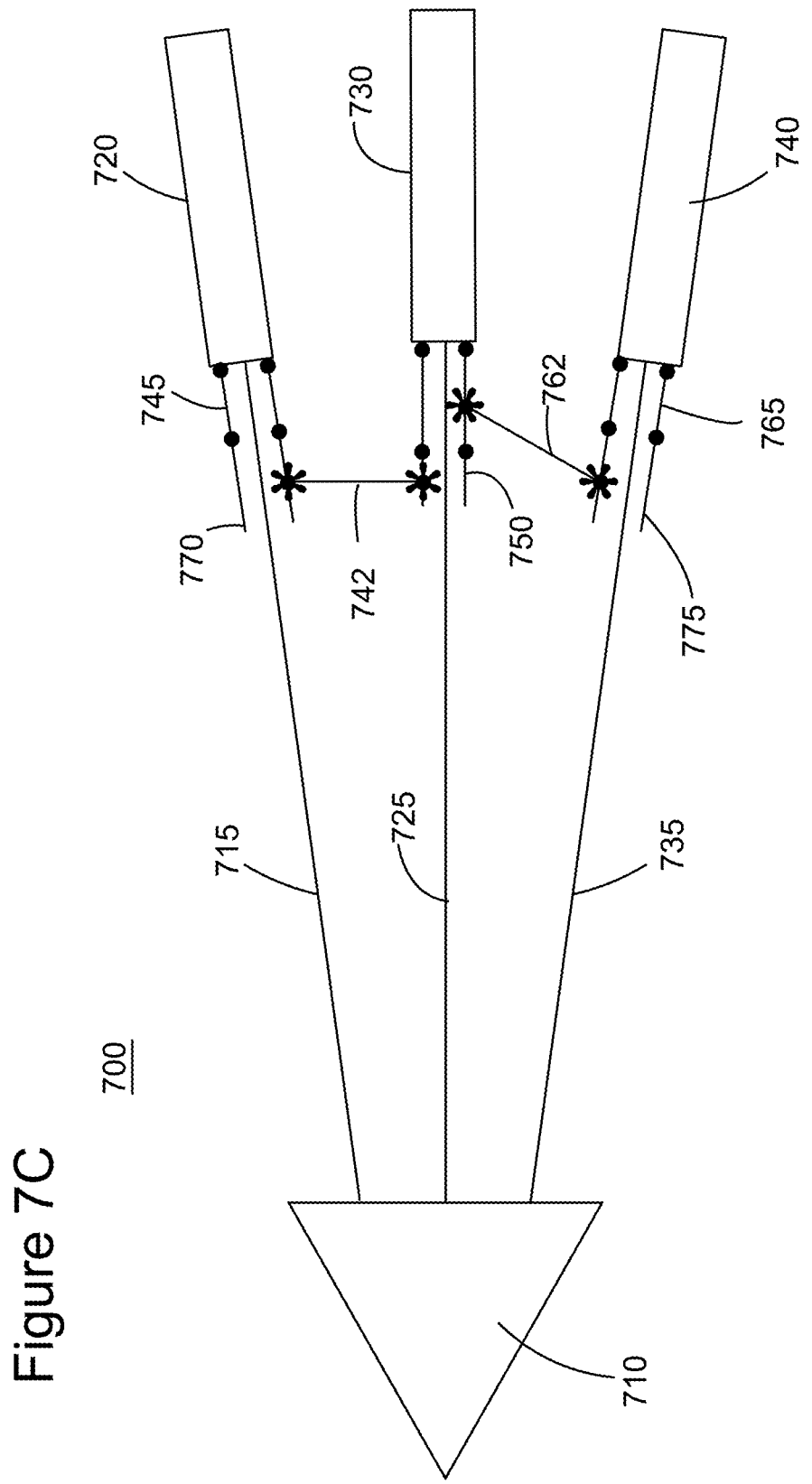

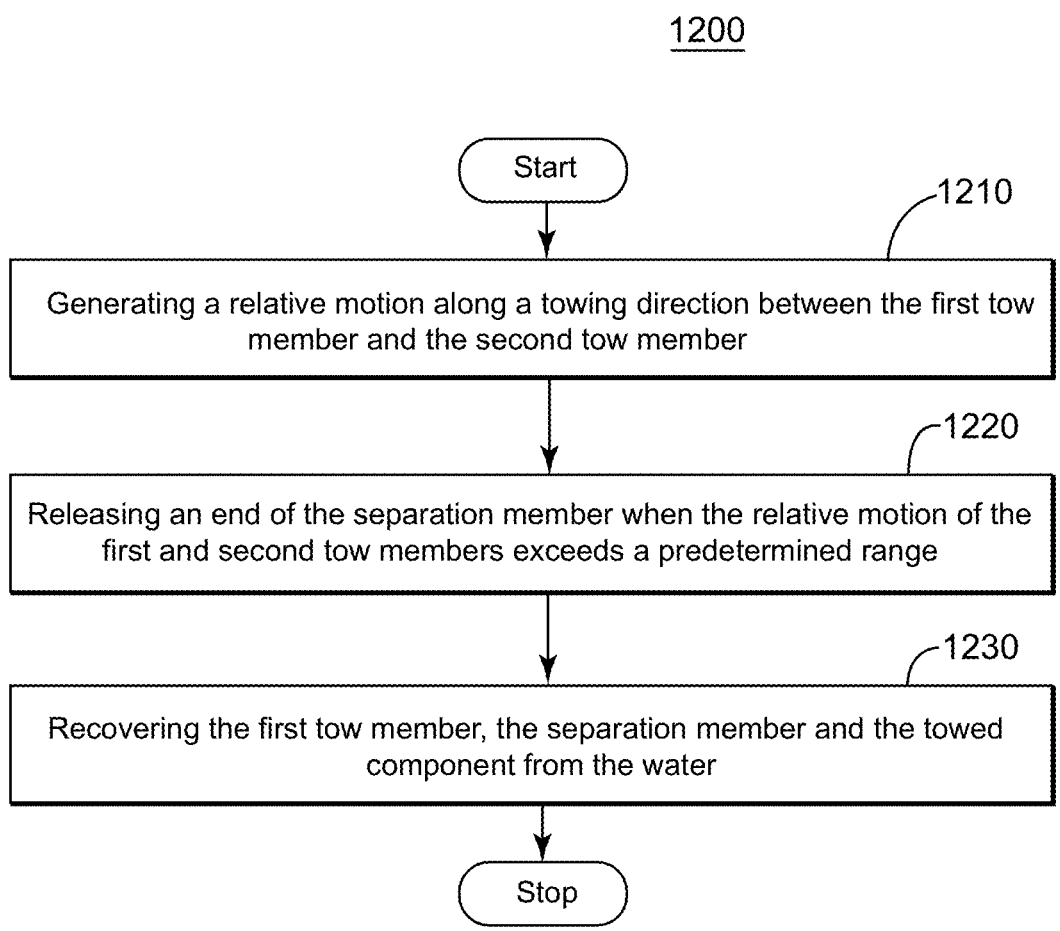

COLLAR SYSTEM AND METHOD FOR RECOVERING A TOW MEMBER IN A MARINE SURVEY SYSTEM

CROSS REFERENCE TO RELATED APPLICATIONS

This application claims priority and benefit from U.S. Provisional Patent Application No. 61/815,754 filed Apr. 25, 2013, for "Gun Collar System: Recovering Method," U.S. Provisional Patent Application No. 61/815,759 filed Apr. 25, 2013, for "Gun Collar System: Variable Drag," and U.S. Provisional Patent Application No. 61/844,573 filed Jul. 10, 2013, for "Gun Collar System: Fixation on the Umbilical," the contents of which are incorporated in their entirety herein by reference.

BACKGROUND

Technical Field

Embodiments of the subject matter disclosed herein generally relate to deploying and recovering tow members of a marine survey system and, more particularly, to a collar system on a tow member.

Discussion of the Background

Interest in developing offshore oil and gas production fields has dramatically increased in recent years. Due to the high cost of offshore drilling, those undertaking it rely heavily on marine surveys and other geological investigations for selecting drilling locations so as to minimize the risk of a dry well.

Marine surveys generate profiles (images) of the geophysical structure under the seafloor. While these profiles do not provide an accurate location of oil and gas reservoirs, those trained in the field may use them to estimate the presence or absence of oil and/or gas.

A marine survey may be performed using the marine seismic survey system 100 illustrated in FIG. 1 (bird's-eye view). A vessel 110 tows seismic sources 120 and multiple seismic streamers 130 through the water. The seismic sources 120 typically include plural sub-arrays of air guns configured to generate seismic waves. These seismic waves propagate downward into the geophysical structure under the seafloor and are reflected upward from interfaces between geological layers, inside which the seismic waves propagate with different speeds. Hydrophones embedded in the seismic streamers detect the reflected waves. Data related to the reflected waves is recorded and processed to provide information about the underlying geological features.

Lately, interest has increased in repeating marine surveys in the same areas at long time intervals (months or years) to monitor the evolution of geophysical structure under the seafloor (e.g., changes caused by extraction of oil and gas from a deposit). The marine survey data acquired during distinct surveys of the same area may be assembled to form four-dimensional (4D) data sets. In this context, it increases the importance of being able to accurately reproduce a baseline (i.e., earlier or first) survey in a later monitor survey(s).

Reproducing the baseline survey means reproducing the geometry of the marine survey system (i.e., relative positions of the source and detectors), as well as reproducing the location of the shots (i.e., positions at which the waves are generated). This task is difficult to accomplish because the marine survey system is subject to currents, winds, etc., and has limited maneuverability. Separation members such as (but not limited to) ropes and cables are frequently used on a marine survey system's interconnected towed components to enhance its maneuverability and geometric stability. However, the presence of these separation members may make deployment and, particularly, recovery of the towed components difficult.

In U.S. Patent Application Publication No. 2010/0170428, separation ropes are attached via sliders to umbilical cables used to tow source sub-arrays. A slider is configured to switch between an engaged state and a disengaged state. During the engaged state, the slider is locked at a fixed position along the umbilical cable. During the disengaged state, the slider moves freely along the umbilical cable.

FIG. 2 illustrates a conventional seismic source 200 consisting of two groups of sub-arrays, group 210 (including sub-arrays 212, 214 and 216) and group 220 (including sub-arrays 222, 224 and 226). Sub-arrays 212, 214, 216, 222, 224 and 226 are connected to towing vessel 201 via tow members 213, 215, 217, 223, 225 and 227, respectively. These tow members are also known as "umbilical cables." Separation ropes 230, 232, 234 and 236 may be connected via sliders at fixed locations along tow members 213, 215, 217, 223, 225 and 227, respectively. Other separation ropes 240 and 242 may interconnect tow members 213 and 227 to lead-in cables 250 and 252, respectively.

The presence of a separation rope prevents a distance between the fixed locations along the tow members (where the separation rope's ends are attached) from exceeding the length of the separation rope. However, on one hand, the presence of separation ropes complicates and delays source sub-array recovery. On the other hand, because the mechanism keeping the slider at the fixed position is exposed for long periods to the marine environment, the mechanism may degrade undesirably and allow the slider to drift along the umbilical cable. Particularly when the towing trajectory is curved, as suggested by arrow 254, separation ropes may experience substantial tensions, causing the slider to disengage as emphasized by oval A in FIG. 2 (showing that a slider holding one end of separation rope 230 slid from its fixed location along tow member 213).

Accordingly, it would be desirable to provide mechanisms and methods that avoid the afore-described problems and drawbacks related to separation members mounted between members used to tow components of marine survey systems.

SUMMARY

To ease recovery of a marine survey system component towed using an individual tow member connected via a separation member to another tow member, a collar used to fixedly attach an end of the separation member is configured to conditionally release the end of the separation member. The collar includes a locking system configured to receive the end of the separation member, and to release this end when a lock-release condition is met. A variable drag force mechanism may be attached to the collar to ease reaching and maintaining a collar's intended position on the tow member.

According to one embodiment, there is a marine survey system including first and second tow members, a separation member and a collar. The first and second tow members are used to tow components of the marine survey system. The separation member is configured to connect the first tow member to the second tow member. The collar is affixed to the second tow member and is coupled to an end of the separation member such that to release the separation member when a first release condition is met.

According to another embodiment, there is a method for retrieving a seismic system component towed underwater via a first tow member that is connected to a second tow member via a separation member, the separation member being attached to the second tow member via a collar configured to release the separation member when a release condition is met. The method includes generating a relative motion along a towing direction between the first tow member and the second tow member. The method further includes releasing an end of the separation member when the relative motion of the first and second tow members exceeds a predetermined range. The method also includes recovering the first tow member and the separation member from the water.

According to yet another embodiment, there is a marine survey system including a tow member, a collar and a variable drag force mechanism. The tow member is configured to tow marine survey system equipment. The collar is mounted on the tow member to connect a separation rope to the tow member. The variable drag force mechanism is attached to the collar and configured to generate a first drag force pushing the collar downstream along the tow member until reaching a downstream element beyond which the collar cannot move, and to generate a second drag force after the collar has reached the downstream element, the second force being smaller than the first force.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 7A, 7B and 7C are schematic diagrams of a marine survey system according to another embodiment;

FIG. 12 is a flowchart illustrating steps performed by a method for retrieving a towed component according to an embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a seismic source of a marine seismic survey system. However, the embodiments to be discussed next are not limited to tow members used to tow source sub-arrays, but may be applied to other tow members used to tow deflectors or streamers and having separation members fastened there-between to limit the distance between the various attachment locations.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In some embodiments, collars used to connect separation members (also known as "distance members") to tow members are configured to release an end of the separation member when a release condition is met. For example, the collars may include a lock-release mechanism. In another example, the collar may be connected to the end of the separation member via magnets that separate when the tension in the separation member exceeds the magnetic force. Additionally or alternatively, collars may include a variable drag force mechanism configured to favor the collar reaching and maintaining an intended position on the tow member.

A marine survey system includes plural components (source arrays, streamers, deflectors, etc.) towed by one or more vessels using tow members. In the following description, the towed components are seismic source sub-arrays, but these towed components are merely exemplary and not intended to be limiting (e.g., one or both towed components may also be a deflector or a streamer).

Figure 1:
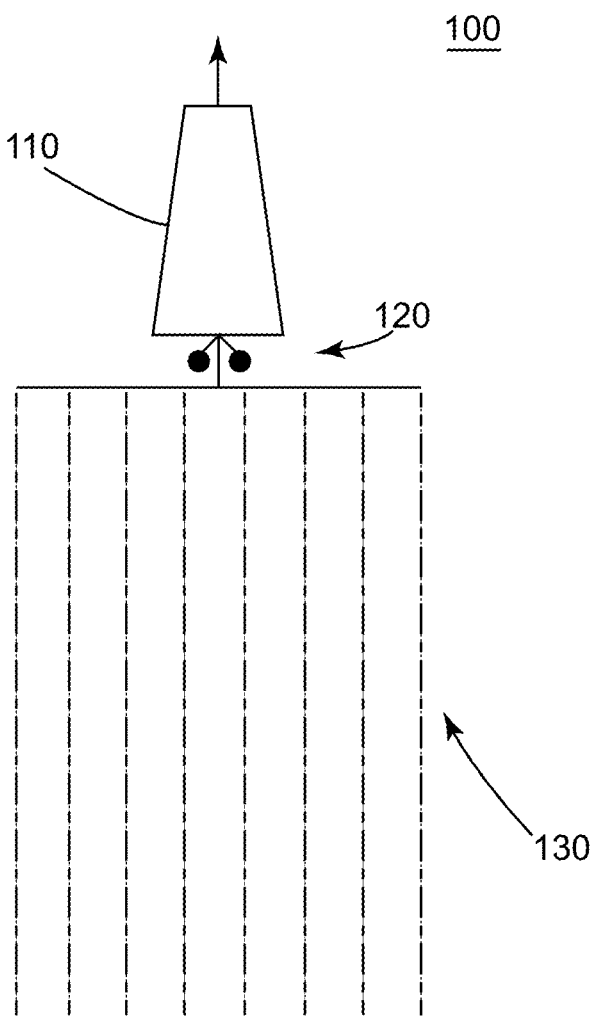
FIG. 1 is a generic diagram of a marine survey system.
Figure 2:
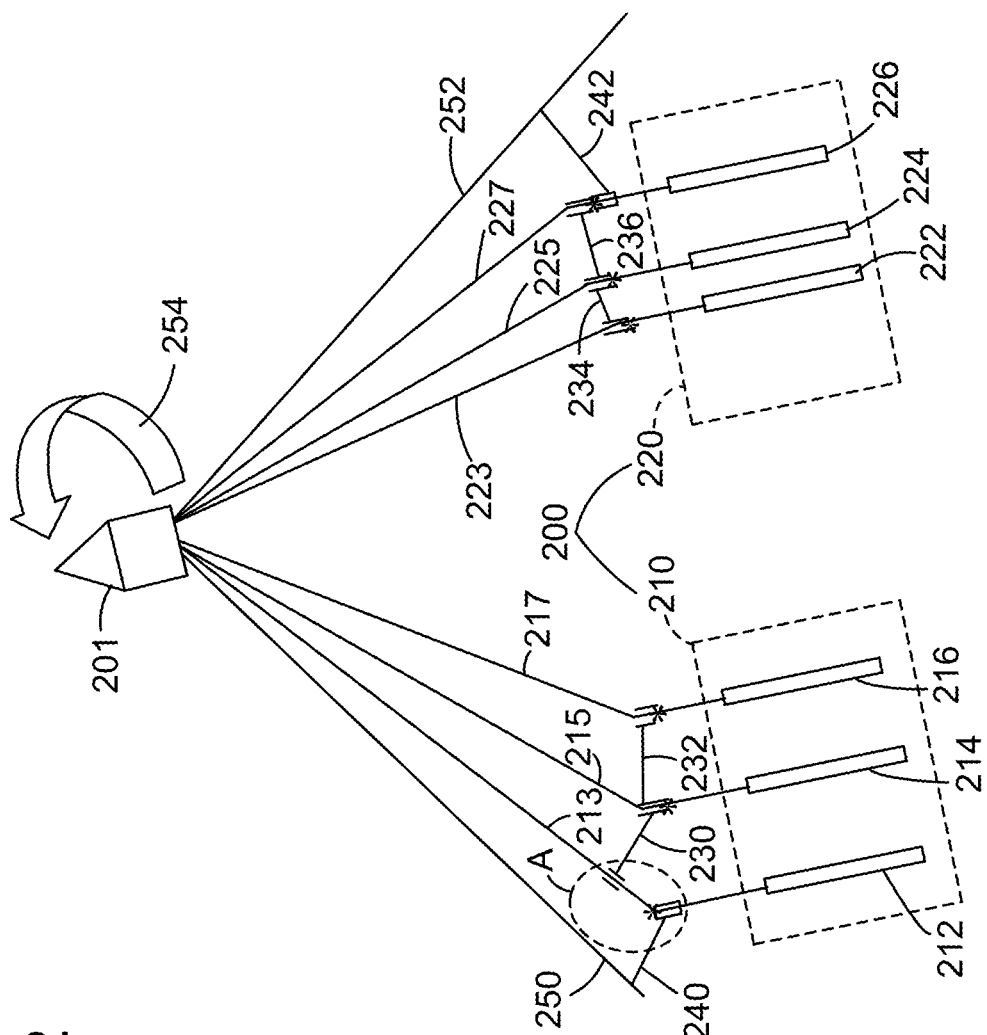
FIG. 2 is a schematic diagram of a conventional marine survey system.
Figure 3:
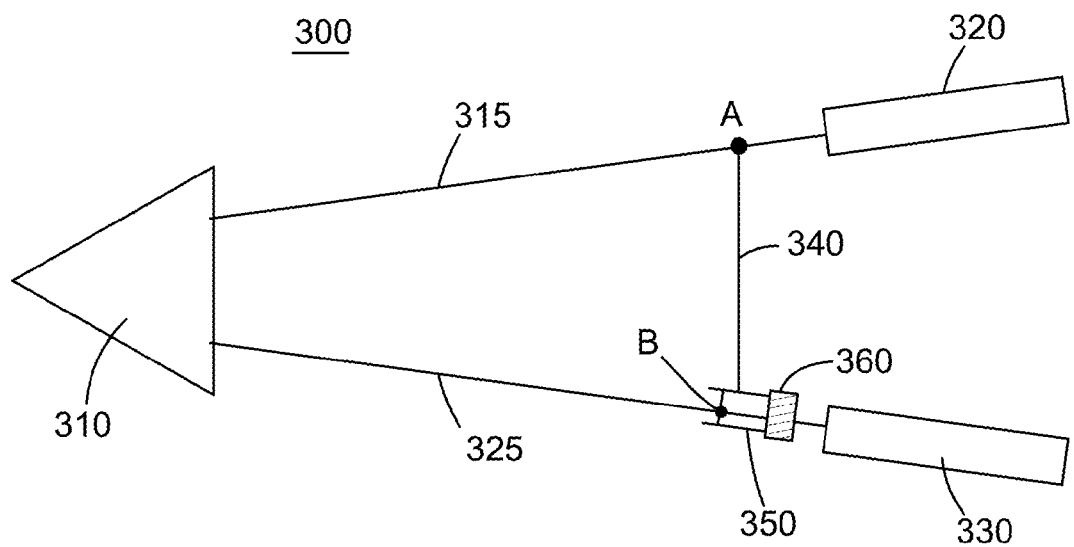
FIG. 3 is a schematic diagram of a marine survey system according to an embodiment.

FIG. 3 illustrates marine survey system 300, which includes vessel 310 towing first seismic source sub-array 320 and second seismic source sub-array 330 via first tow member 315 and second tow member 325, respectively. Separation member 340 is fixedly attached at A to first tow member 315 and to collar 350 mounted on second tow member 325. Collar 350 may be attached to bend restrictor 360 to be fixedly positioned at B on second tow member 325. Bend restrictor 360 may have a diameter larger than the diameter of the second tow member.

Figure 4:
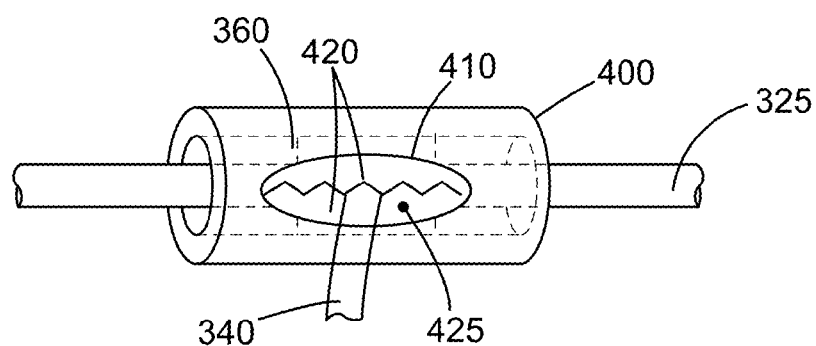
FIG. 4 is a schematic diagram of a collar according to an embodiment.

In one embodiment illustrated in FIG. 4, collar 400 has a locking system configured to receive an end of separation member 340, and to release this end when a lock-release condition is met. Inside an opening 410 of the collar's outer shell, interlocking teeth 420 are biased to close opening 410, for example, due to a spring element 425. Interlocking teeth 420 may release the end of the separation member when tension in separation member 340 exceeds a predetermined value (e.g., 410 kgf).

Figure 5A:
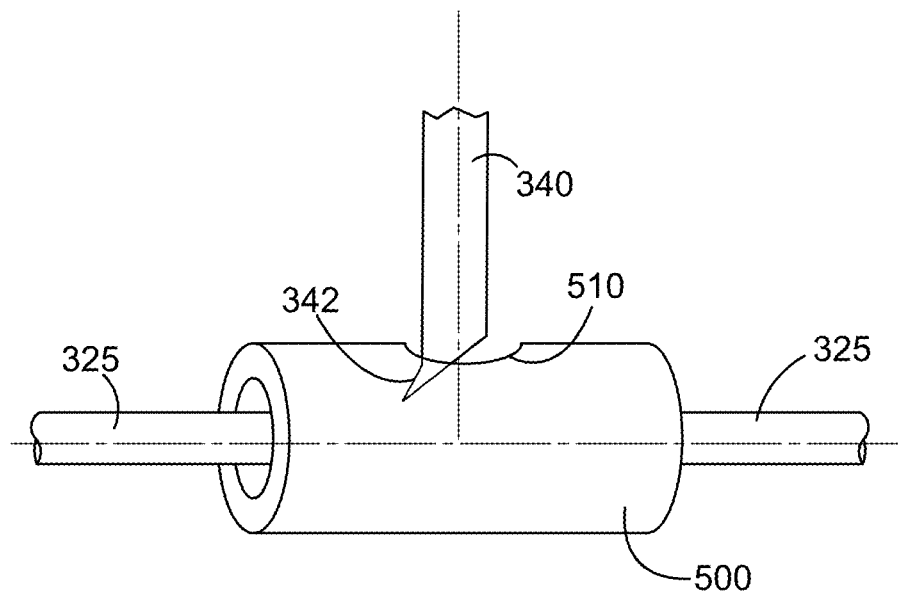
FIGS. 5A and 5B are schematic diagrams of a collar in operation (5A) and when a separation member becomes disengaged (5B), according to an embodiment.
Figure 5B:
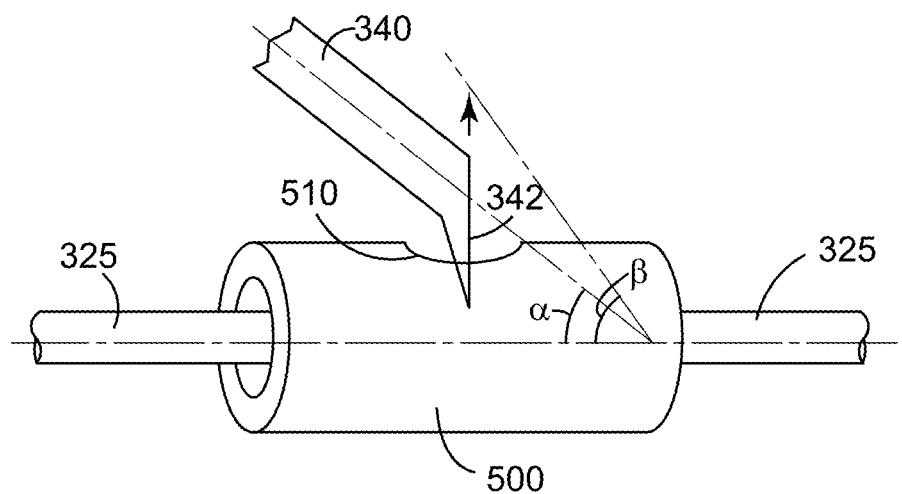

For another locking system, the lock-release condition may be met if an angle between separation member 340 and tow member 325 becomes smaller than a predetermined value. For example, as illustrated in FIG. 5A, a hook 342 at the end of separation member 340 is inserted in recess 510 of the collar's outer shell, to attach separation member 340 to collar 500. As illustrated in FIG. 5B, hook 342 slides out of recess 510 (as suggested by the upward arrow) when the angle α between separation member 340 and longitudinal axis of tow member 325 becomes smaller than a predetermined angle β.

Returning now to FIG. 3, if tow member 315 (or tow member 325) is pulled toward vessel 310 (e.g., to be recovered on the vessel's deck), the lock-release condition is met and therefore the locking system of collar 350 (e.g., 400 or 500) releases separation member 340. In other words, the lock-release condition is met when a relative translation in towing direction exceeding a predetermined threshold occurs between tow members 315 and 325.

Figure 6:
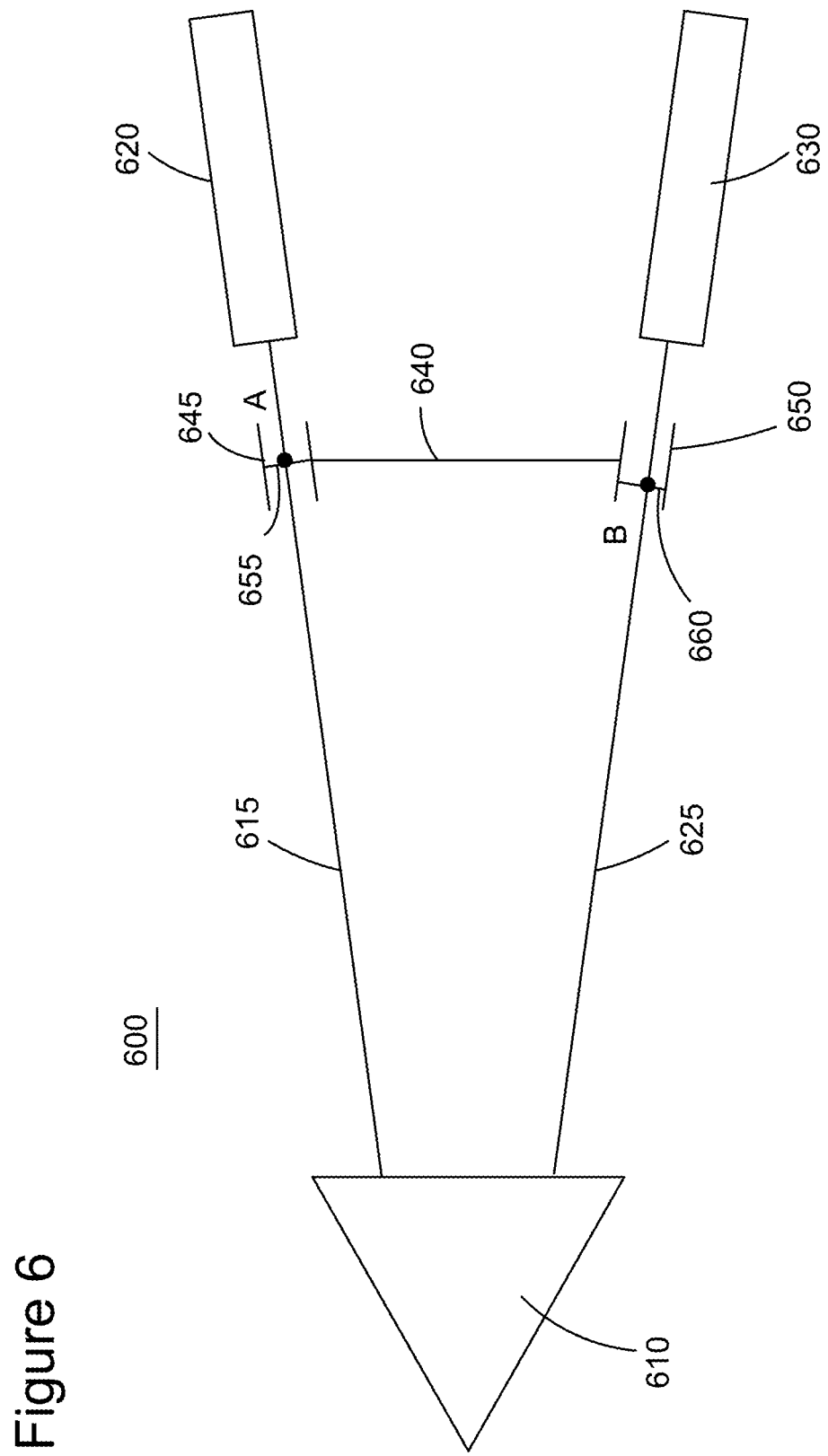
FIG. 6 is a schematic diagram of a marine survey system according to another embodiment.

FIG. 6 illustrates marine survey system 600, which includes vessel 610 towing first seismic source sub-array 620 and second seismic source sub-array 630 via first tow member 615 and second tow member 625, respectively. Separation member 640 is attached to a collar 645 mounted on first tow member 615 and to collar 650 mounted on second tow member 625. Collar 645 may be attached to bend restrictor 655 positioned at A on first tow member 615, and collar 650 may be attached to bend restrictor 660 positioned at B on second tow member 625. Bend restrictors 655 and 660 may have diameters larger than the diameters of the tow members. The collars may be affixed not only to a bend restrictor but also to another collar mounted on the tow member.

Although FIGS. 3 and 6 illustrate marine survey systems with two tow members towing two seismic source sub-arrays, marine survey systems often have three seismic source sub-arrays. FIGS. 7A and 7B, 8, and 9A and 9B describe embodiments including three seismic source sub-arrays. However, the number of towed elements is merely illustrative and not intended to be limiting. In other words, the devices, mechanisms and methods described in this section may be employed in systems having more than three towed components. Additionally, the towed components may be other than seismic source sub-arrays, e.g., deflectors and streamers. The term "tow member" is not intended to refer strictly to a cable connected to a seismic source sub-array, but includes also a lead-in cable used to tow a streamer, or other cables. Other terms such as "umbilical cable" used in technical documents have the same meaning as "tow member."

Figure 7B:
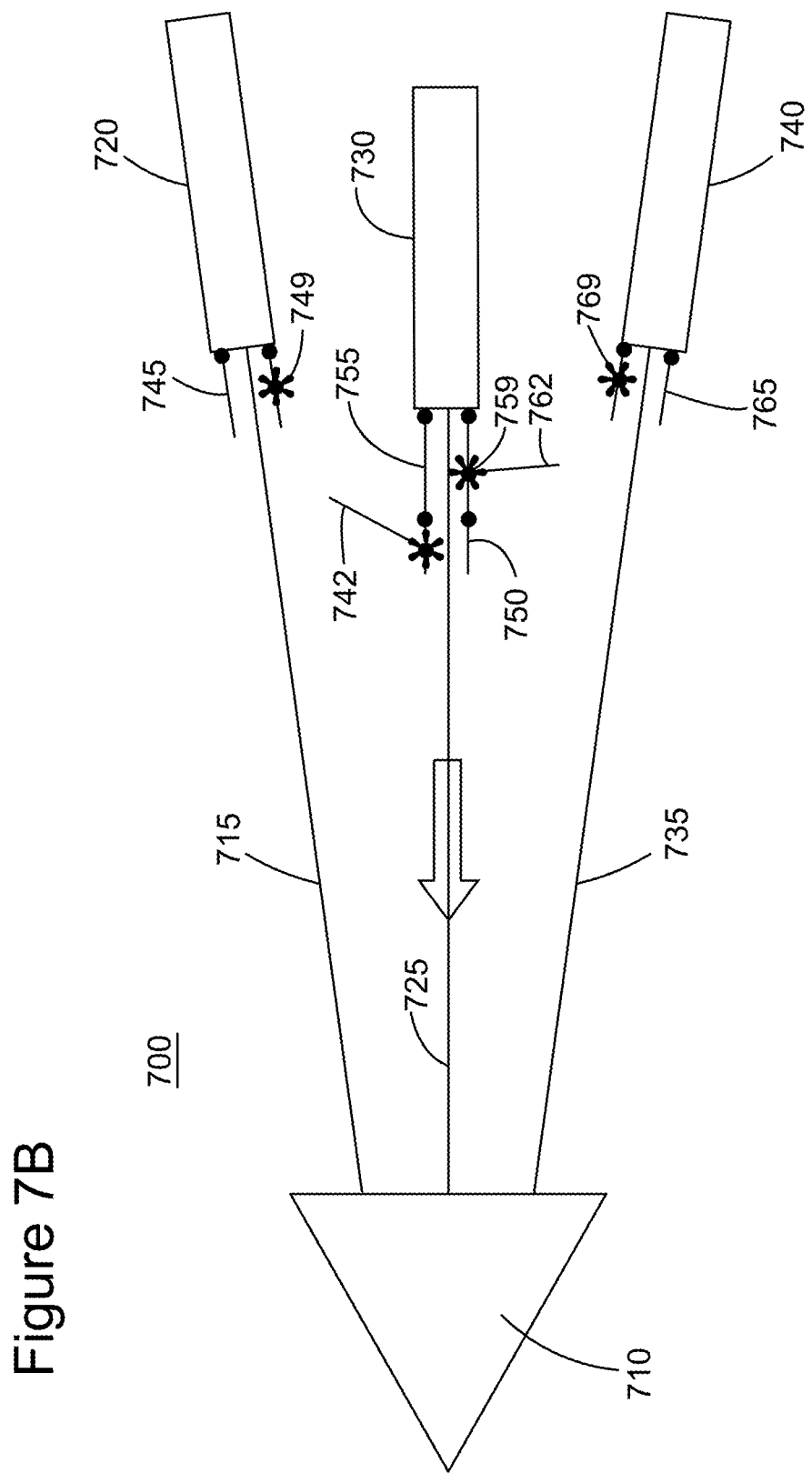

FIGS. 7A, 7B and 7C illustrate marine survey system 700, which includes vessel 710 towing seismic source sub-arrays 720, 730 and 740 via tow members 715, 725 and 735, respectively. FIG. 7A illustrates the configuration of marine survey system 700 in an operative state (when seismic data may be acquired). FIG. 7B illustrates the changes in the configuration of marine survey system 700 due to actions aimed at recovering only seismic source sub-array 730. FIG. 7C illustrates the configuration of marine survey system 700 after sub-array 730 is redeployed.

In the operative state, separation member 742 is attached to collar 745, which is affixed to tow member 715, and to collar 750, which is affixed to tow member 725. Collar 745 has locking system 749 configured to receive an end of separation member 742 and to release this end when a lock-release condition is met. Similarly, collar 750 has locking system 754.

Further, separation member 762 is attached between collar 755 affixed to tow member 725 and collar 765 affixed to tow member 735. Collar 755 has locking system 759 configured to receive an end of separation member 762 and to release this end when a lock-release condition is met. Similarly, collar 765 has locking system 769.

Locking systems 749, 754, 759 and 769 may be any of the embodiments described in this document and their equivalents.

In FIG. 7B, tow member 725 is recovered on vessel 710 as suggested by the arrow along tow member 725. This action (i.e., pulling tow member 725 toward vessel 710) triggers locking systems 749 and 769 to release the ends of separation members 742 and 762, respectively. For example, as described relative to FIG. 4, locking systems 749 and 769 may release the ends of separation members 742 and 762 when tension in the separation member exceeds a predetermined value. In another example, as described relative to FIGS. 5A and 5B, locking systems 749 and 769 may release the ends of separation members 742 and 762 when an angle of the separation ropes with respective tow members becomes smaller than a predetermined value. Thus, separation members 742 and 762 remain attached only to tow member 725 as shown in FIG. 7B.

If tow member 725 is redeployed (e.g., after being repaired/adjusted), new collars 770 and 775 may be mounted on tow members 715 and 735 to reattach separation members 742 and 762. As shown in FIG. 7C, when tow member 725 then slides back from vessel 710 to its operational position between tow members 715 and 735, collars 770 and 775 slide along tow members 715 and 735 and fixedly attach to pre-existing collars 745 and 765.

Figure 8:
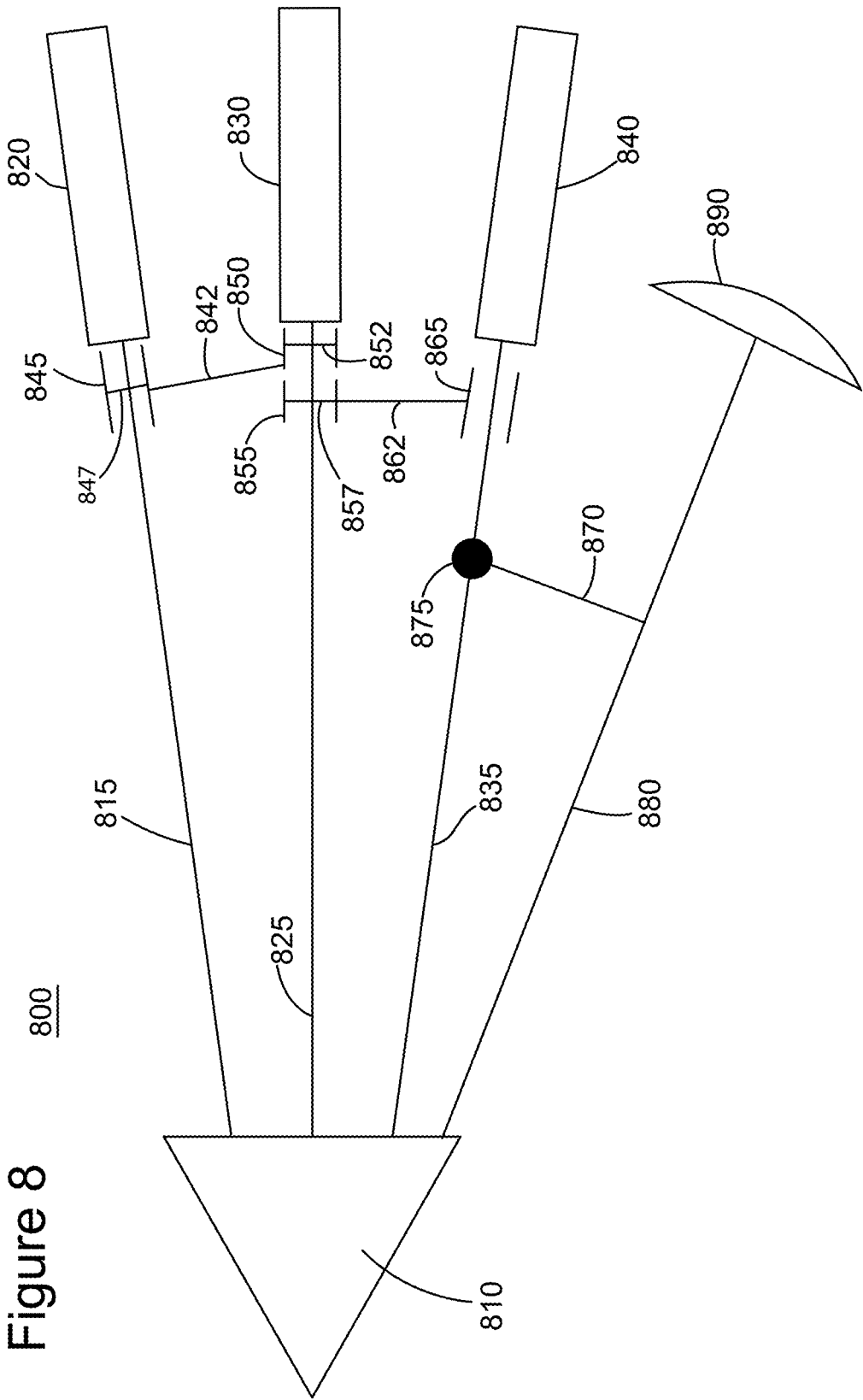
FIG. 8 is a schematic diagram of a marine survey system according to another embodiment.

As previously mentioned, collars are usually affixed to a bend restrictor or another collar mounted on the tow member. FIG. 8 illustrates another technique for keeping a collar at an intended location along a tow member. Marine survey system 800 in FIG. 8 includes vessel 810 that tows seismic source sub-arrays 820, 830 and 840 via tow members 815, 825 and 835. Separation member 842 is attached between collar 845 affixed to tow member 815 and collar 850 affixed to tow member 825. Further, separation member 862 is attached between collar 855 affixed to tow member 825 and collar 865 affixed to tow member 835. Collars 845, 850 and 855 are maintained at their intended positions along the respective tow members due to bend restrictors 847, 852 and 857, respectively.

Another cable 870 connects tow member 835 to lead-in cable 880, which may be used to steer the seismic source sub-arrays 820, 830 and 840, or may tow a deflector 890. Cable 870 is fixedly attached to tow member 835 via winch 875. Collar 865 is maintained at the intended location on tow member 835 because the collar's motion along the tow member is limited between source 840 (which has a diameter larger than tow member 835) and winch 875.

Figure 9A:
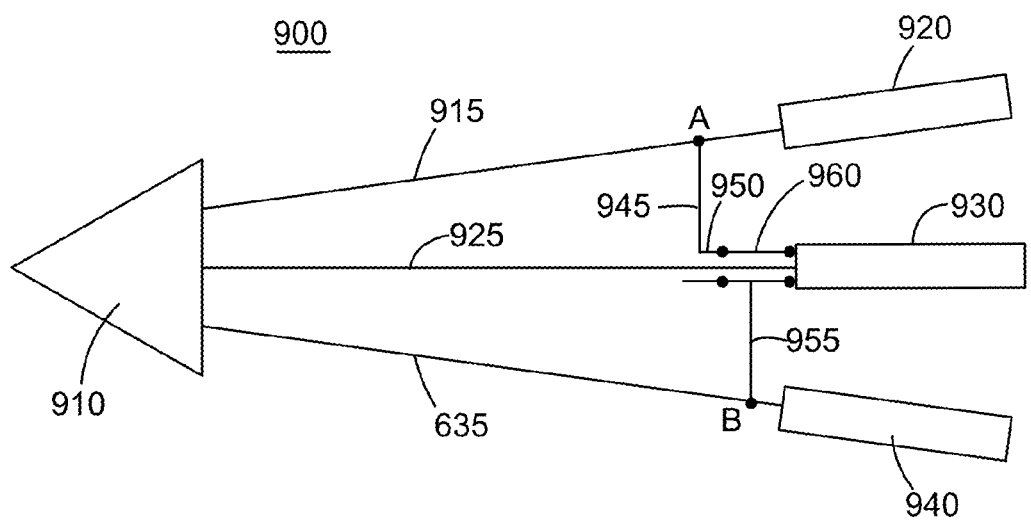
FIGS. 9A and 9B are schematic diagrams of a marine survey system according to yet another embodiment.
Figure 9B:
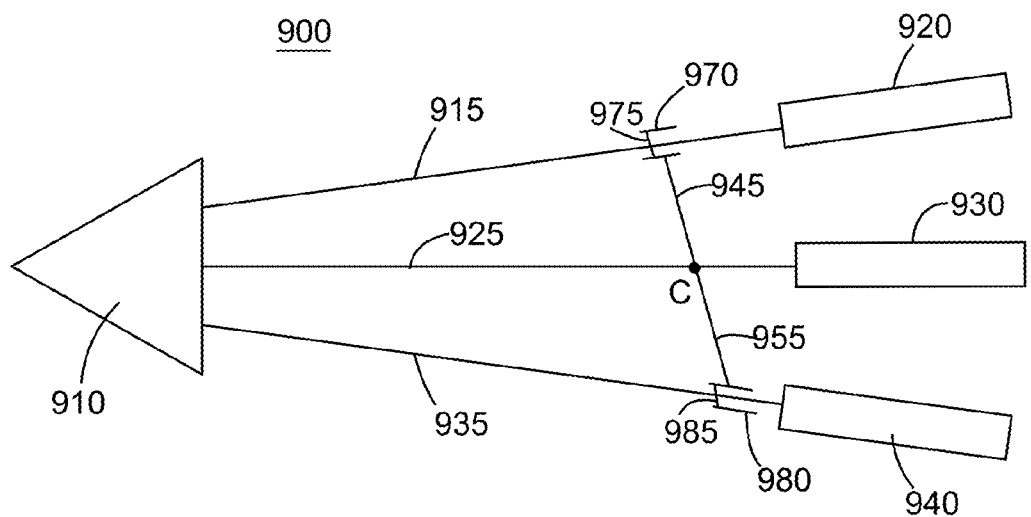

Some separation members have only one end attached to tow members via collars. For example, FIGS. 9A and 9B illustrate marine survey systems including vessel 910 towing seismic source sub-arrays 920, 930 and 940 via tow members 915, 925 and 935. Separation member 945 is connected between tow members 915 and 925, and separation member 955 is connected between tow members 935 and 925.

In FIG. 9A, separation member 945 is connected to tow member 925 via collar 950 and is fixedly attached to tow member 915 at A. Separation member 955 is connected to tow member 925 via collar 960 and is fixedly attached to tow member 935 at B. Collars 950 and 960 may include locking mechanisms configured to release respective ends of separation members 945 and 955 when a lock-release condition is met (e.g., as described relative to FIGS. 4, 5A and 5B).

In FIG. 9B, separation members 945 and 955 are fixedly attached to tow member 925 at C. Separation member 945 is connected to tow member 915 via collar 970 and separation member 955 is connected to tow member 935 via collar 980. Collars 970 and 980 may include locking mechanisms configured to release respective ends of separation members 945 and 955 when a lock-release condition is met (e.g., as described relative to FIGS. 4, 5A and 5B).

In FIG. 9A, collar 950 is mounted on collar 960, which is mounted on source sub-array 920 along tow member 925. In FIG. 9B, collars 970 and 980 are mounted on tow members 915 and 935, respectively, using bend restrictors 975 and 985. The manners of mounting the collars are merely exemplary, not intended to be limiting.

In other embodiments, a collar may include a variable drag force mechanism configured to enable the collar to automatically reach and maintain an intended position on the tow member. The variable drag force mechanism is configured to generate a significant drag force biasing the collar toward a predetermined (intended) location on the tow member. Once the collar has reached the location, the variable drag force mechanism is configured to reduce the drag force.

Figure 10A:
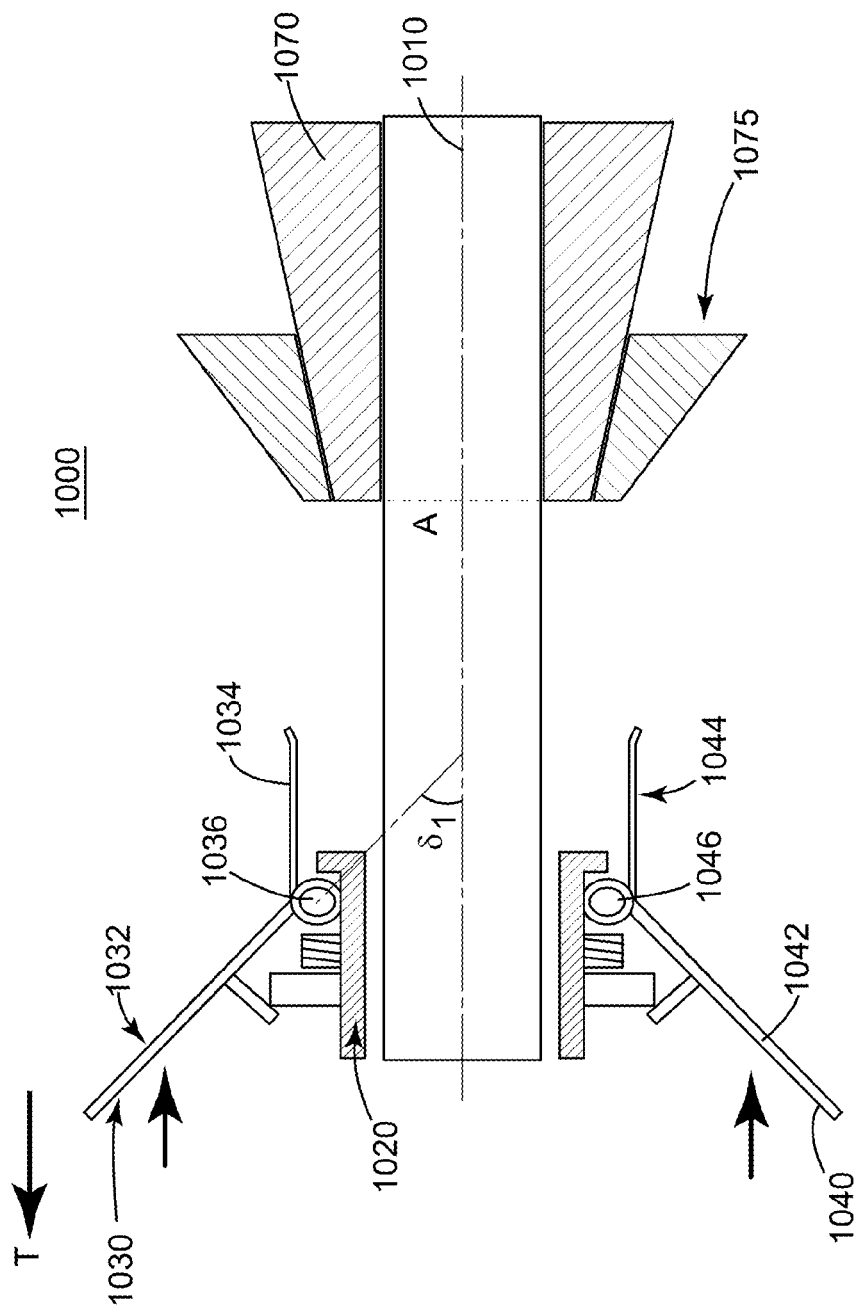
FIGS. 10A and 10B are schematic diagrams of a collar including a variable drag force mechanism according to an embodiment.
Figure 10B:
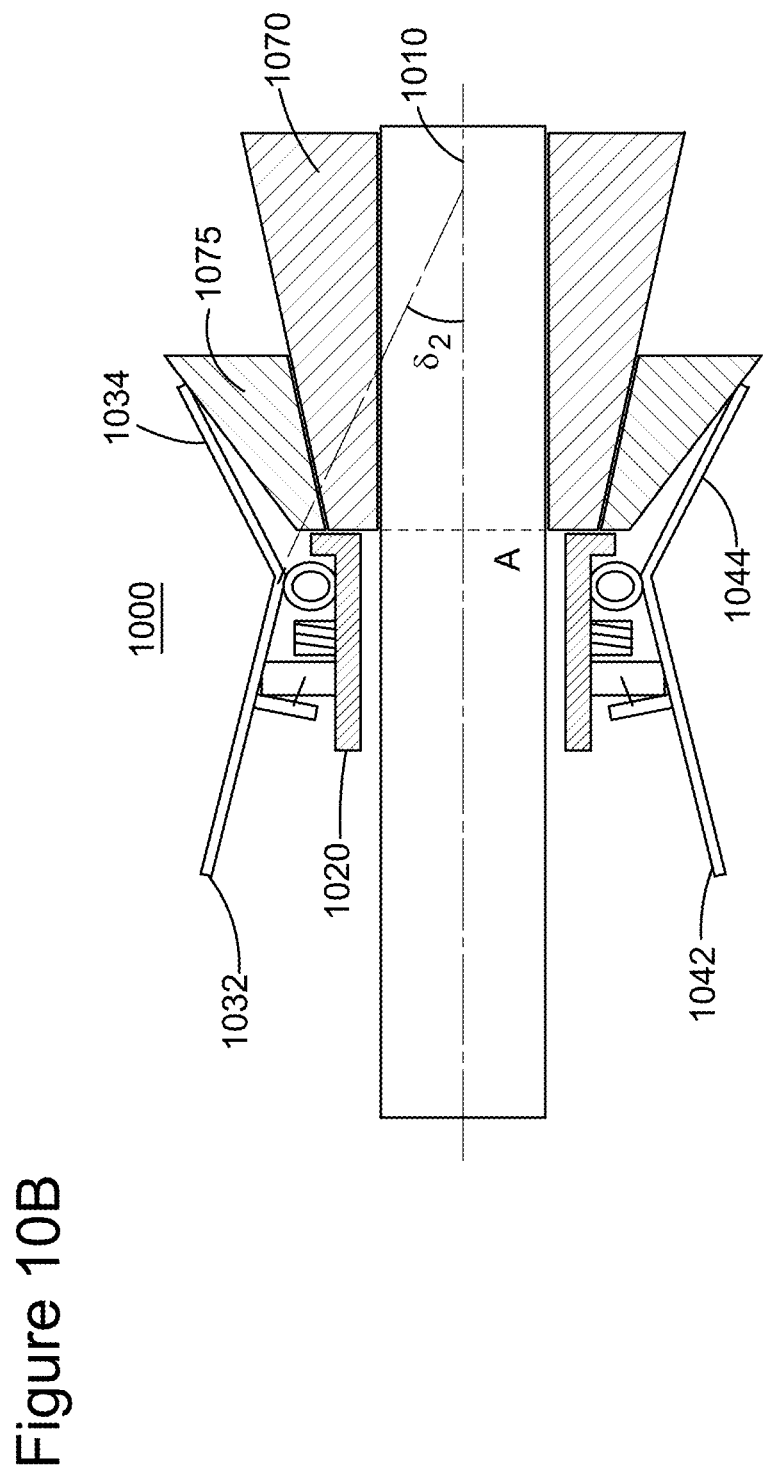

FIGS. 10A and 10B are cross sections through a collar 1020 having a variable drag force mechanism on a tow member 1010. FIG. 10A illustrates a situation before collar 1020 has reached its intended location A, and FIG. 10B illustrates a situation after collar 1020 has reached its intended location A.

The variable drag force mechanism is configured to generate a drag force dependent on the collar's location. Wings, such as 1030 and 1040 in FIGS. 10A and 10B (note that not all elements are labeled in FIG. 10B) are configured so that preferably the net force in a plane perpendicular to the tow member 1010's longitudinal axis to be zero, independent from the collar's location. If this net force is not zero, the wings would cause undesirable lateral or vertical forces, increasing friction between the collar and tow member. The variable force mechanism has at least three such wings, but may have more than three. If fewer but larger area wings are used, a wing has to withstand more stress than if its area were smaller. On the other hand, if many smaller wings are used, one of the wings is more likely to become damaged, causing a non-zero perpendicular net force.

Each wing has a forward portion (i.e., 1032 and 1042) and a back portion (i.e., 1034 and 1044) joint together via a loop (i.e., 1036 and 1046). The forward portion may be longer than the back portion. The wings are configured so as to be able to rotate around the center of the loop. The forward portion of the wing is relatively thin for its size and may be paddle-shaped.

Before collar 1020 has reached its intended location A, forward portions 1032 and 1042 of the wings expose a substantial area to the water flowing against towing direction T (as suggested by the arrows pointing toward the forward portions 1032 and 1042). The drag force is proportional to the area (i.e., the larger the area, the larger the drag force). The size of area exposed to the flow by a wing depends on an opening angle $\delta_1$ of the forward portion with the towing direction. Since collar 1020 is free to move along tow member 1010, the drag force pushes collar 1020 from left to right, toward downstream element 1070 (e.g., a bend restrictor or a source), which has a larger diameter than tow member 1010.

When the collar reaches the downstream element, the back portion of the wing starts touching the downstream element's outer surface. Then, as the collar continues to be pushed downstream, the back portion's distal end is pushed upward due to the downstream element, making the whole wing to rotate around the center of the loop to reach a position as illustrated in FIG. 10B. This wing rotation has the effect of decreasing the opening angle. As the opening angle decreases to $\delta_2 < \delta_1$, the area exposed by the forward portion of the wing decreases and the force pushing the collar toward the collar stopper lessens. If the downstream element does not provide the larger slope necessary to cause enough wing rotation, additional part 1075 may be mounted thereon.

Figure 11A:
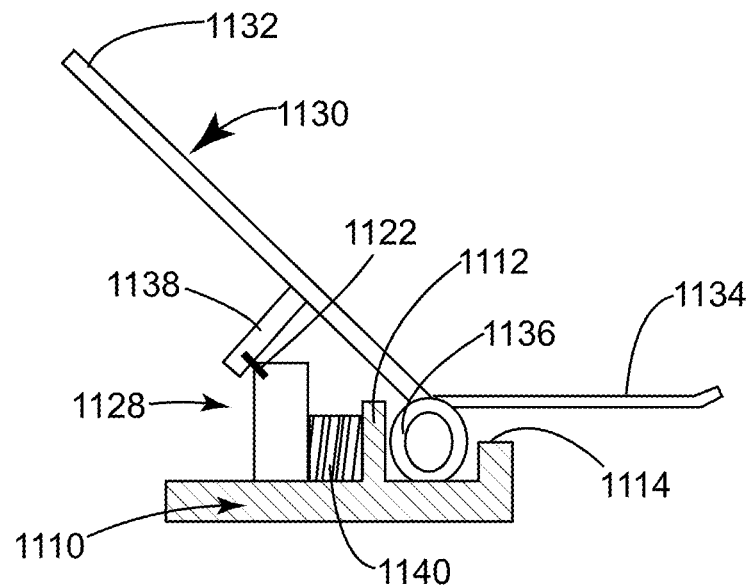
FIGS. 11A and 11B illustrate details of the variable drag force mechanism according to an embodiment.
Figure 11B:
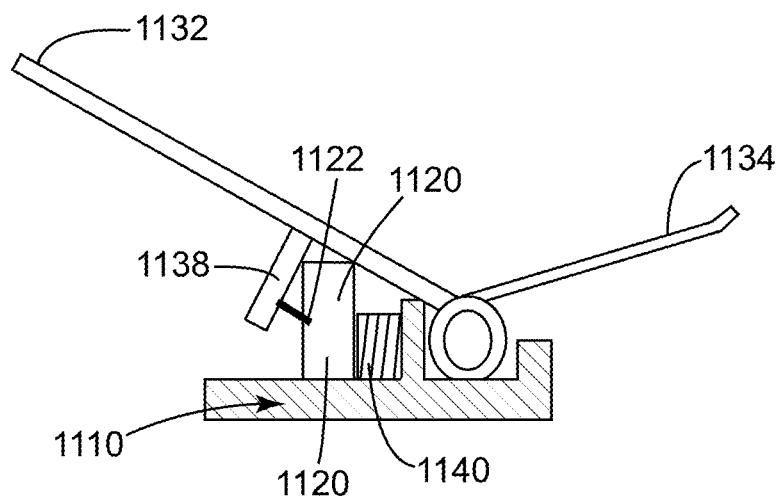

Focusing now on the manner in which the wings are mounted on the collar, FIGS. 11A and 11B illustrate collar body 1110, ring 1120, wing 1130 (which has forward portion 1132 and back portion 1134 connected together via loop 1136) and spring 1140. FIG. 11A illustrates the situation before the collar has reached its intended location, and FIG. 11B illustrates the situation after the collar has reached its intended location.

Collar body 1110 is configured to surround a towing member and has a section 1112 with a larger diameter than most of the collar body. Section 1112 separates wing's loop 1136 from spring 1140. Collar body 1110 may also have a stop section 1114 with a larger diameter positioned at downstream side of the collar body. Stop section 1114 would enlarge the collar's contact area with the downstream element and diminish contact tension there-between.

Wing's loop 1136 is mounted so it cannot migrate outside the space between sections 1112 and 1114. For example, in one embodiment, loop 1136 has a link passing through the loop's center, with the link's ends fixedly attached to the collar's body. In another embodiment, another ring passing through loops of all the wings may surround the collar body.

A wing extension 1138 is located on the wing's forward portion 1132 and is substantially perpendicular to it. Wing extension 1138 is in contact with ring 1120 that surrounds collar body 1110. Spring 1140 is biased to push ring 1120 forward, thereby pushing wing extension 1138 up to "open" the forward portion to have a large area exposed to the water flow. Wing extension 1138 may be linked to ring 1120 via link 1122 so as to limit the wing's opening angle and confine spring 1140.

After the collar reaches its intended location, wing 1130 rotates so the opening angle of forward portion 1132 decreases. Wing extension 1138 then pushes ring 1120, which then compresses spring 1140, as illustrated in FIG. 11B.

During operation, if the collar unintentionally departs from its intended position near the downstream element, the collar's back portion 1134 slides down the downstream element's outer surface, and spring 1140 pushes ring 1120 forward, causing extension 1138 to move away from collar body 1110. The opening angle then increases, and forward portion 1132 exposes a larger area to the water flow. The larger area causes a greater force pushing forward portion 1132 and the whole collar downstream. Thus, the variable-force mechanism automatically makes the collar return to the intended position.

In one other embodiment, a collar may be provided with another mechanism configured to lock the collar to the downstream element.

An advantage of collars having lock-release mechanisms as previously described with respect to FIGS. 4, 5A and 5B is that individual towed components may be retrieved and redeployed without having to recover adjacent components. A flow diagram of a method 1200 for retrieving a single towed component is illustrated in FIG. 12. The seismic system component is towed underwater via a first tow member connected to a second tow member via a separation member. The separation member is attached to the second tow member via a collar having a locking mechanism, which is configured to release the separation member when a lock-release condition is met. Method 1200 includes generating a relative motion along a towing direction between the first and second tow members, at 1210.

Method 1200 further includes releasing an end of the separation member when the relative motion of the first and second tow members exceeds a predetermined range, at 1220. Method 1200 also includes recovering the first tow member, the separation member and the towed component from the water, at 1230.

The relative motion of the first and second tow members exceeding the predetermined range results in satisfying the lock-release condition. In one embodiment, the lock-release condition is an angle between the separation member and the second tow member (on which the collar is mounted) becoming smaller than a predetermined angle. In another embodiment, the lock-release condition is a tension in the separation member being larger than a predetermined value. The first and second tow members may be umbilical cables used to tow a seismic source sub-array or a lead-in cable used to tow a deflector or a streamer.

Method 1200 may further include redeploying the first tow member, the separation member and the towed component while placing a new collar on the second tow member. The new collar may include a variable drag mechanism as described above, enabling the new collar to automatically reach and maintain an intended location along the second tow member. Note that the first collar may not have been recovered with the first tow member and the separation member. The new collar then may be configured to lock on the first collar instead of locking on the downstream element.

The collar may have a variable drag force mechanism attached that is configured (i) to generate a first drag force pushing the collar toward the second location on the second tow member towed through water, before the collar is positioned at the second location, and (ii) to generate a second drag force less than the first force, after the collar is positioned at the second location.

Figure 13A:
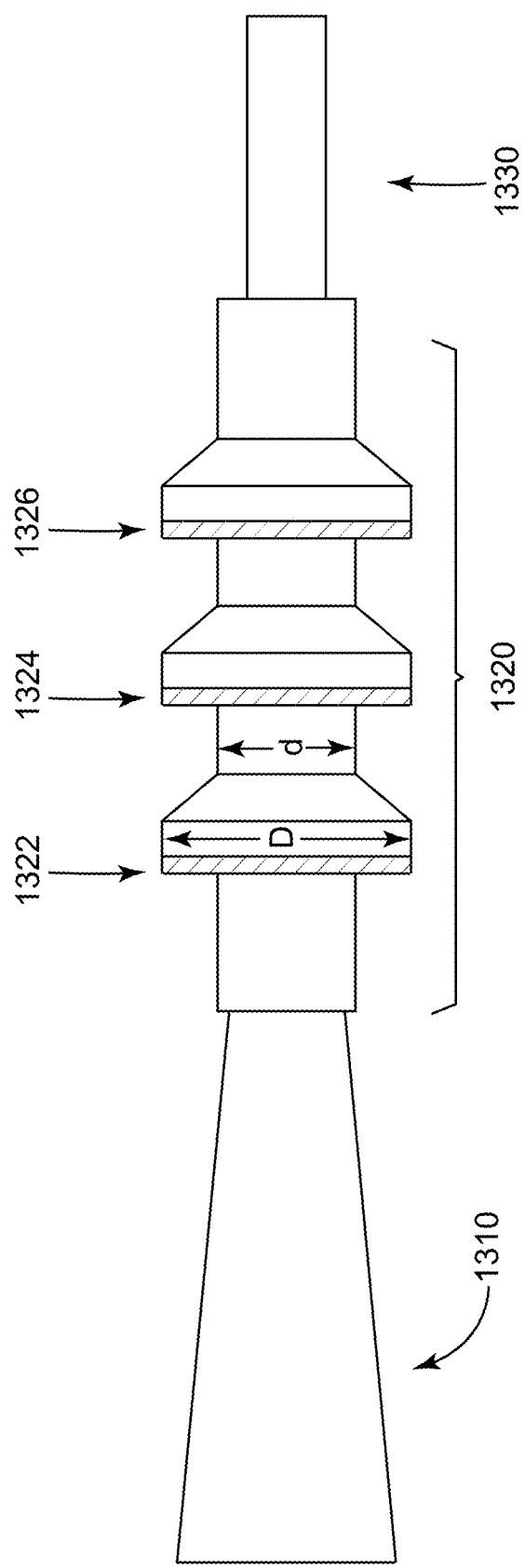
FIGS. 13A and 13B illustrate a gun collar attachment mechanism according to another embodiment.

As illustrated in FIGS. 7A-C, 8 and 9A, the gun collars may lock to a bend restrictor (e.g., 720-740, 820-840 or 920 to 940) or to another gun collar. However, if in time the number of gun collars ahead of the bend restrictor on a tow member (e.g., 715-735, 815-835, or 915-935) increases, the tow member is prevented from bending which limitation may lead to damaging the tow member. Additionally, as the number of gun collars increases, a location along the tow cable where the separation rope is attached may be shifted too far away from the bend restrictor. To solve this problem, according to an embodiment, the gun collars are configured to lock themselves on a part mounted along the tow member. FIG. 13A illustrates a bend restrictor 1310 and a gun collar locking part 1320 adjacent to bend restrictor 1310 fixedly attached along a tow member 1330. Gun collar locking part 1320 is configured to accommodate/lock three gun collars (this number being merely an illustration and not intended to be a limitation). Gun collar locking part 1320 may be made from the same material (e.g., polyurethane) as bend restrictor 1310 and may include three metallic rings 1322, 1324, and 1326 configured to prevent the gun collars from sliding away from bend restrictor 1310. The metallic rings have a diameter D larger than a diameter d of the part between the rings (transition from the smaller diameter d to the larger diameter D being made gradually).

Figure 13B:
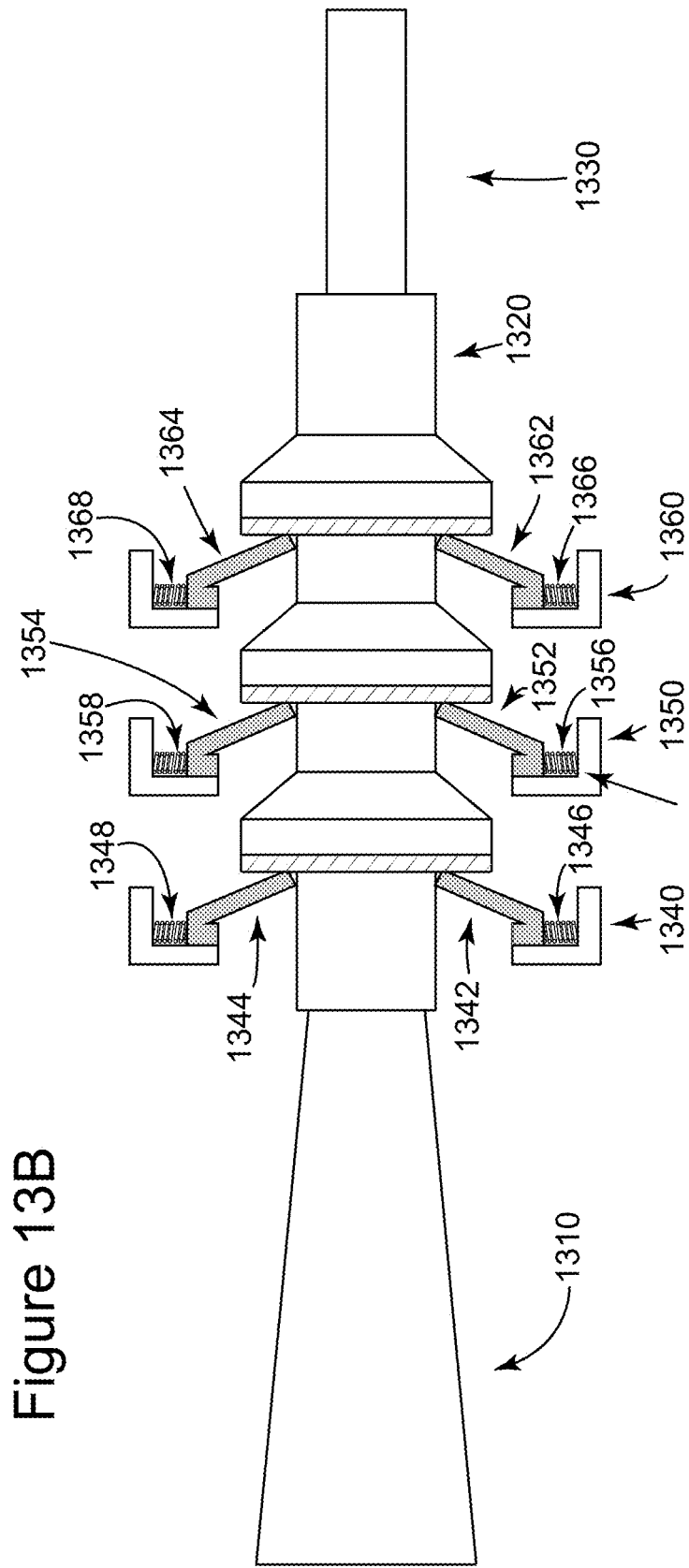

As illustrated in FIG. 13B, gun collars 1340, 1350 and 1360 have each a mechanism that allow them to slide towards bend restrictor 1310. This mechanism is made of legs (e.g., 1342 and 1344, 1352 and 1354, or 1362 and 1364) pushed by springs (e.g., 1346 and 1348, 1356 and 1358, or 1366 and 1368) towards part 1320. Due to the gradual transition from the smaller diameter d to the larger diameter D, the legs compress the springs to slide over the rings toward the bend restrictor. However, the legs cannot compress the springs to pass back, away from the bend restrictor. Thus, the gun collar's longitudinal motion is limited between a ring and another gun collar closer to the bend restrictor. This embodiment allows gun collars to be packed closer together near the bend restrictor alleviating the above-identified problem of the separation rope being attached too far from the bend restrictor.

The disclosed exemplary embodiments provide devices, mechanisms and methods related to separation members attached via collars on tow members of marine survey systems. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A marine survey system, comprising:
a first tow member and a second tow member used to tow components of the marine survey system;
a separation member configured to connect the first tow member to the second tow member; and
a first collar affixed to the second tow member and coupled to an end of the separation member, the first collar being configured to release the separation member when a first release condition is met so that the separation member separates from the second tow member,
wherein the first tow member and the second tow member are either an umbilical cable used to tow a seismic source sub-array or a lead-in cable used to tow a deflector or a streamer.

2. The marine survey system of claim 1, wherein the first release condition is an opening angle between the separation member and the second tow member being smaller than a predetermined value.

3. The marine survey system of claim 1, wherein the first release condition is a tension along the first separation member is larger than a predetermined force value.

4. The marine survey system of claim 1, further comprising:

a second collar configured to be mounted on the first tow member coupled to a second end of the first separation member, the second collar being configured to release the second end of the first separation member when a second release condition is met.

5. The seismic survey system of claim 1, further comprising:
a third tow member configured to be deployed underwater;
a second separation member configured to connect the second tow member to the third tow member; and
a third collar affixed to the third tow member coupled to an end of the second separation member, the third collar being configured to release the end of the second separation member when a third release condition is met.

6. The seismic survey system of claim 1, wherein the first collar is mounted on a bend restrictor or on another collar having a diameter larger than a diameter of the first tow member.

7. The seismic survey system of claim 1, wherein a motion of the first collar along the second tow member is limited between a downstream element beyond which the collar cannot move and a winch mounted on the second tow member.

8. The seismic survey system of claim 1, further comprising:
a variable drag force mechanism attached to the first collar and configured
(i) to generate a first drag force pushing the first collar downstream along the second tow member until reaching a downstream element beyond which the collar cannot move; and
(ii) to generate a second drag force after the collar has reached the downstream element, the second force being smaller than the first drag force.

9. The seismic survey system of claim 8, wherein the variable drag force mechanism includes wings and is configured so that the wings expose a larger area to water flow before the first collar reaches the downstream element than after the first collar reaches the downstream element.

10. The seismic survey system of claim 9, wherein the variable drag force mechanism further includes springs biased to make the wings to expose a larger area to water flow and each of the wings includes a forward portion and a back portion connected to each other by a loop, the wing being configured to rotate around the loop.

11. The seismic survey system of claim 10, further comprising:
an additional part added on the downstream element and configured to provide a larger outer surface slope than the downstream element otherwise provides, the back portion sliding along the larger outer surface slope causing the wing to rotate around the loop when the first collar moves downstream.

12. The seismic survey system of claim 8, wherein the variable drag force mechanism is further configured to revert to generating the first drag force, if the collar moves upstream away from the downstream element, and to generate the second drag force if the collar has then reached again the downstream element.

13. The marine survey system of claim 1, wherein the first collar is affixed to a gun collar locking part mounted on the second tow member and configured to prevent the first collar from sliding upstream along the second tow member.

14. A method for retrieving a seismic system component towed underwater via a first tow member that is connected to a second tow member via a separation member, the separation member being attached to the second tow member via a first collar configured to release the separation member when a release condition is met, the method comprising:
generating a relative motion along a towing direction between the first tow member and the second tow member;
releasing an end of the separation member when the relative motion of the first and second tow members exceeds a predetermined range so that the separation member separates from the second tow member; and
recovering the first tow member and the separation member from the water.

15. The method of claim 14, wherein the release condition is an angle between the separation member and the second tow member becoming smaller than a predetermined angle or the release condition is a tension in the separation member being larger than a predetermined value.

16. The method of claim 14, further comprising:
redeploying the first tow member and the separation member with a new collar configured to slide downstream along the second tow member and lock onto the collar.

17. The method of claim 14, wherein the collar has a variable drag force mechanism, and the method further includes:
generating, by the variable drag force mechanism, a first drag force pushing the collar downstream before the collar reaches a downstream member on the second tow member, and
generating, by the variable drag force mechanism, a second drag force after the collar reaches the downstream member, the second force being smaller than the first force.

18. A marine survey system, comprising:
a tow member configured to tow marine survey system equipment;
a collar mounted on the tow member to connect a separation rope to the tow member; and
a variable drag force mechanism attached to the collar and configured
to generate a first drag force pushing the collar downstream along the tow member until reaching a downstream element beyond which the collar cannot move, and
to generate a second drag force after the collar has reached the downstream element, the second force being smaller than the first force.

19. The marine survey system of claim 18, wherein the variable drag force mechanism includes a wing, and is configured such that, when the tow member is towed through water,
the wing to make a first opening angle with a towing direction before the collar reaches the downstream element, and
the wing to make a second opening angle with the towing direction after the collar has reached the downstream element.

* * * * *